Figure 1:
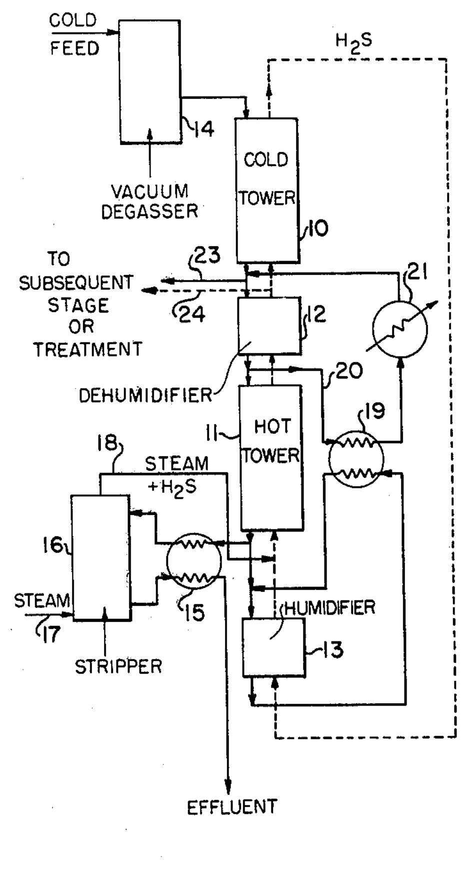

United States Patent [19]

Pauluis et al.

[11] 4,015,944

[45] Apr. 5, 1977

[54] DUAL TEMPERATURE DEUTERIUM EXTRACTION PROCESS

[75] Inventors: Gerard J. C. A. Pauluis; Alistair I. Miller, both of Deep River, Canada

[73] Assignee: Atomic Energy of Canada Limited, Ottawa, Canada

[22] Filed: Dec. 18, 1974

[21] Appl. No.: 533,768

[30] Foreign Application Priority Data

Mar. 19, 1974 Canada .............................. 195387

[52] U.S. Cl. .......................... 23/270.5 W; 423/580; 423/563

[51] Int. Cl.² ...................... C01D 11/00; C01B 5/02

[58] Field of Search .................. 423/580, 563, 648; 23/270.5 W, 260

[56] References Cited

UNITED STATES PATENTS

| | | | |
|---|---|---|---|
| 2,895,803 | 7/1959 | Spevack | 423/580 |
| 3,860,698 | 1/1975 | Spevack | 423/580 |

*Primary Examiner*—Earl C. Thomas

*Attorney, Agent, or Firm*—J. R. Hughes

[57] ABSTRACT

A dual temperature isotope exchange process of the type having a first stage comprising a hot and a cold tower with liquid and gas passing in countercurrent exchange relation therein, the gas being recycled from the top of the cold tower to the bottom of the hot tower via a humidifier section through which a liquid stream also passes, a dehumidifier between hot and cold towers through which both gas and liquid streams pass, the improvement comprising the feeding of the inlet feed liquid at a raised temperature to the top of the humidifier section that is, to a point between the liquid outlet of the hot tower and the liquid input to the humidifier and the recycling of a portion of the liquid leaving the hot tower to the top of the cold tower preferably via a cooling device.

5 Claims, 3 Drawing Figures

H2S
COLD FEED
COLD TOWER
26
10
23
24
DEHUMIDIFIER
21
12
27
20
19
PRESSURE DEGASSER
11
HOT TOWER
STEAM +H2S
18
BOOSTER
13b
HUMID RECYCLE
13a
16
15
STEAM
17
STRIPPER
EFFLUENT

DUAL TEMPERATURE DEUTERIUM EXTRACTION PROCESS

This invention relates to an improvement in the dual-temperature isotope exchange process for concentrating an isotope of an element especially deuterium by its exchange between two substances at two temperatures.

The dual-temperature isotope concentration process (GS process) for the concentration of deuterium by exchange between a liquid (water) and a gas ($H_2S$) is described in Canadian Pat. No. 574,293 issued Apr. 21, 1959 to J. S. Spevack and assigned to Atomic Energy of Canada Limited. In this and other subsequent patents, the system involves a series of hot and cold tower pairs with the inlet feed water being applied normally with only minor temperature conditioning (cold feed) directly to the top of the cold tower of the first pair of units and the effluent extracted below bottom of the hot tower. The $H_2$ S has recycled from the top of the cold tower is heated and humidified before entering the bottom of the hot tower either by indirect contact or direct contact with a closed loop water recycle at effluent concentration. The production ($P_{CF}$) of an infinite recovery cold feed process is given by $$P_{CF} = L\left(1 - \frac{\alpha_{hot}}{\alpha_{cold}}\right)x_f$$

with

L = feed flow rate $\alpha$ = equilibrium constant for deuterium $H_2O$ — $H_2S$ exchange $x_f$ = feed concentration The productivity of the GS process can be increased by boosting the deuterium concentration in the gas before its feeding to the hot water.

Canadian Pat. No. 866,116 issued Mar. 16, 1971 to D. F. Babcock and assigned to the USAEC described a system of increasing the productivity of the GS process by the addition of a hot feed to some position in the hot tower thus increasing the deuterium concentrations in the effluent and the gas entering the hot tower. The improvements is achieved by increasing the flow of liquid with respect to the gas through the lower portion of the hot tower by the introduction of an additional liquid flow at substantially feed concentration to a location having the liquid flowing down at a concentration not more than the concentration of the additional stream. This location is above the gas entrance to the hot tower and the additional flow is about 5 to 200% by weight of said liquid feed to the cold tower as described and claimed in the Babcock patent.

There is an evergrowing history of water quality related upsets in GS heavy water plants. The early plants in Savannah River have had long experience of these problems but they have been more acute with the more demanding Canadian plants. One of the problems has been that of water quality. Because of the huge amounts of water that must be handled by the first stage of the process, it is difficult to purify the feedwater to the extreme degree that appears desirable to avoid foaming in the tower trays that it is realized is caused at least in part by impurities (foamers) in the feed water.

Another problem with the standard cold feed has been that of feed water control. Because of the tight relationships that must exist between liquid/gas and extraction the cold feed process is very sensitive to small perturbations in the feed flow.

It is an object of the invention to provide a GS heavy water process that will result in less foaming action in the towers.

It is an other object of the present invention to provide an improved GS heavy water process that will be easier to control.

These and other objects of the invention are achieved by a dual temperature isotope exchange process of the type having a first stage comprising a hot and a cold tower with liquid and gas passing in countercurrent exchange relation therein, the gas being recycled from the top of the cold tower to the bottom of the hot tower via a humidifier section through which a liquid stream also passes, a dehumidifier between hot and cold towers through which both gas and liquid streams pass, the improvement comprising the feeding of the inlet feed liquid at a raised temperature to the top of the humidifier section that is, to a point between the liquid outlet of the hot tower and the liquid input to the humidifier and the recycling of a portion of the liquid leaving the hot tower to the top of the cold tower preferably via a cooling device.

Figure 2:
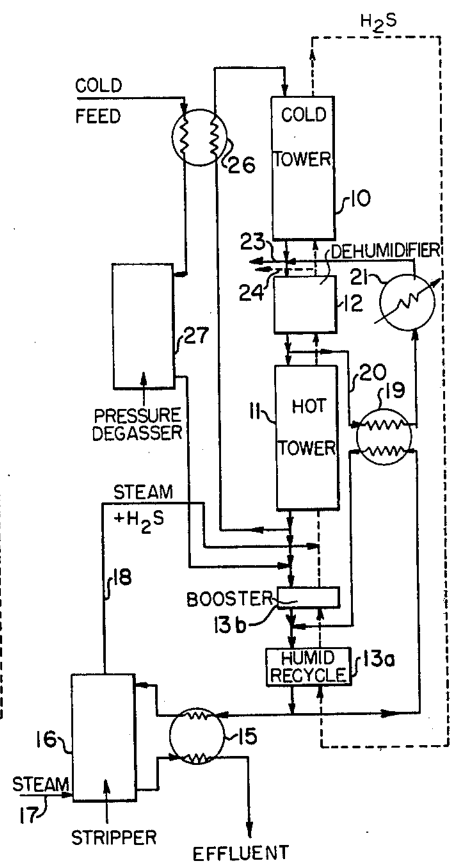
Figure 3:
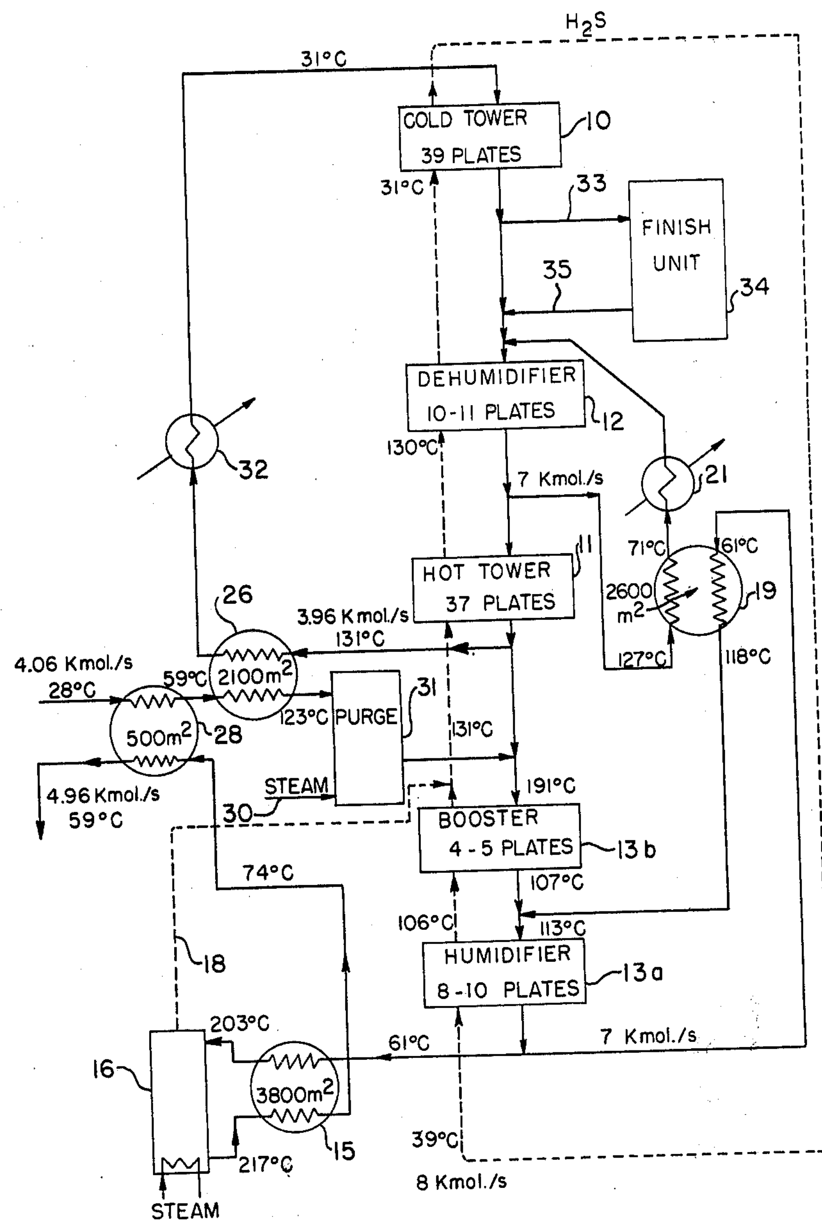

In drawings which illustrate an embodiment of the invention,

FIG. 1 is a flow diagram of a typical prior art cold feed first stage of a GS deuterium extraction system, FIG. 2 is a flow diagram of a hot feed first stage of a GS deuterium extraction system, and FIG. 3 is a more detailed flow diagram of the system of FIG. 2.

Referring to FIG. 1, the first stage of a conventional cold feed GS process is shown and comprises a cold tower 10 and a hot tower 11 with a liquid (solid line) and a gas (broken line) passing in countercurrent exchange relationship through the towers and through a dehumidifier 12 positioned between the towers. The towers may or may not be in stacked relation. The gas ($H_2S$) is recycled from the top of the cold tower to the bottom of the hot tower via a humidifier 13. The input cold feed (water) passes through a vacuum degasser 14 and is applied directly to the to of the cold tower. The liquid from the hot tower passes through a heat exchanger 15 and a stripper 16 which serves to remove dissolved gas after which it is discharged to waste after proper recovery of most of its heat content.

Heat is given to the process either by indirect heating of the liquid recycled around the humidifier or by direct steam injection into the stripper or to the bottom of the hot tower. When steam 17 is injected into the stripper and after picking up $H_2S$ 18 it is applied to the system, normally to the bottom of the hot tower. A portion of the effluent liquid passes through humidifier 13 and in heat exchange relation (heat exchanger 19) with a liquid flow 20 taken from the bottom of the dehumidifier and recycled via the heat exchanger and a cooler 21 to the top of the dehumidifier. A portion of the enriched liquid 23 or gas 24 or both may be taken from a location between cold and hot reactions and cascaded forward to a second stage or to other types of enrichment process. The structure and functioning of the components of the system described above are well known and have been described fairly extensively in patents and the literature.

An improved enrichment system according to the invention is shown in FIG. 2 and generally involves a similar set up of towers, humidifier, dehumidifier, heat exchangers, stripper, etc. which are identified by the same numbers as FIG. 1. In this arrangement however the input cold liquid feed is heated in heat exchanger 26. Optimally it may next pass through pressure degasser which serves to remove entrained gas. The liquid feed is then applied to the top of the humidifier. The humidifier is separated into two sections, a humidifier recycle section 13*a* and a booster section 13*b* with the liquid passing to heat exchanger 19 cycling through the humidifier recycle section only. The booster section which typically would have 4 or 5 plates compared to the main humidifier section (typically 8 to 10 plates) provides increased enrichment and heating to the $H_2S$ gas before it enters the hot tower. Liquid from the bottom of the hot tower is recycled to the top of the cold tower via a cooling means, shown here as heat exchanger 26.

FIG. 3 is a more detailed illustration of the flow sheet of FIG. 2 giving typical temperatures and flow rates for various components. This figure, in which the components are numbered the same as in FIG. 2, also indicates typical number of plates for the cold and hot towers and humidifiers and dehumidifiers and sizes for the heat exchangers. In this arrangement the inlet cold feed is first heated in heat exchanger 28 through which passes the effluent liquid from the stripper and to a higher level in heat exchanger 26. This heated liquid is applied along with an injection of steam 30 to purging apparatus 31 and then to the top of the humidifier sections. It may be necessary to additionally cool the recycled liquid and this is done in suitable cooling apparatus 32. An output 33 may be taken from the liquid line between towers and passed to a second stage or a further treatment unit 34 with a return flow 35 back to the system.

The production, $P_{HF}$, of an infinite recovery hot feed process as described above is $$P_{HF} = G\frac{x_f}{\alpha_{hot}}\left(1 - \frac{\alpha_{hot}}{\alpha_{cold}}\right)$$

where $G = H_2S$ gas flow rate.

The ratio $P_{HF}/P_{CF}$) is typically 1.13. However, in practice the hot feed process can improve the approach to infinite recovery of a typical installation, as use is made of the humidifier trays for deuterium transfer. Improvements in production in cases with higher than conventional feed ratio can go as high as 15%.

The recycling of the liquid from the bottom of the hot tower presents two advantages: higher liquid purity and easier control.

Because there is typically about 15% humidity in the gas entering the hot tower and only 0.3% in the gas leaving the cold tower, there is a continuous purification by distillation of the liquid in the first stage, the fraction of the liquid returned from the hot tower to the humidifier is the condensate return of this distillation and represents typically 30% of the liquid flow in the cold region. The water circulating in the cold-hot pair will be much purer than in the first stages of existing plants. It is considered that this will reduce foamers.

On top of the improvement brought in winter operation, the purity of water in the hot feed process will likely make possible operation at higher gas throughputs that the actual 75% obtained in laboratory with distilled water and $H_2S$. The resulting increase in extraction will be directly proportional to the increase in higher gas throughputs achieved.

The hot liquid feed process described here will thus eliminate the upsets caused by liquid entrained impurities. None of the chemicals added to treat the feed water will get into the cascade. Volatile impurities which might be entrained with the feed can be readily eliminated by flash degassing at 170° C before feeding the liquid to the hot tower. By this means, upsets that might be caused by these impurities either directly or after reaction with $H_2S$ will be eliminated. The only causes of upsets left would essentially be due to impurities introduced with make-up $H_2S$ or by reaction in the GS system.

The water purification feature of the hot feed process may take a particular importance in plants with liquid interstages connections. In these plants the higher stages will not operate with water purer than the first stages and could suffer water induced upsets if cold feed is used. Because of the higher deuterium inventory, the consequences of upsets in those higher stages may be much more serious for the production than upsets in the first stage.

In the hot feed process, as represented here although the liquid/gas (L/G) sensitivity of the cold-hot tower pair is the same as with the cold feed, it is a function of the recycle rate and not of the feed rate. The recycle is a more easily controllable stream and should thus require less frequent adjustments. Also because the L/G is no more a function of the feed flow the towers can be run at full gas flow rate whatever be the liquid supply. A corollary of this is the possibility to operate the first stages in full recycle mode, keeping the deuterium profile in the towers and proper L/G adjustment while no feed is provided because other parts of the plant are down, to shorten startup time. Also the sensitivity of the booster-humidifier section to changes in feed rate is remarkably low. Typically reduction of feed rate by 50% reduces production by 12%.

We claim:

1. Apparatus for obtaining a product enriched in deuterium by dual temperature isotope exchange comprising:

a. a hot and a cold tower with liquid and gas streams passing in countercurrent deuterium exchange relation therein, b. means for recycling the gas from the top of the cold tower to the bottom of the hot tower, c. a humidifier section between cold and hot towers through which a liquid stream and the recycled gas passes, d. a dehumidifier between hot and cold towers through which the gas and liquid streams pass, e. means for heat exchange between humidifier and dehumidifier, f. a cold liquid feed inlet to the apparatus, g. a heat exchanger for heating the cold liquid feed, h. means for applying said heated liquid to the system at the top of the humidifier section at a point between the liquid outlet of the hot tower and the liquid input to the humidifier, i. means for recycling a portion of the liquid leaving the hot tower to the top of the cold tower via the said heat exchanger, and j. means for taking a product enriched in deuterium from the system.

2. Apparatus for obtaining a product enriched in deuterium by dual temperature isotope exchange as in claim 1 wherein the liquid is water and the gas is hydrogen sulphide.

3. Apparatus for obtaining a product enriched in deuterium by dual temperature isotope exchange as in claim 1 wherein the liquid being recycled from the bottom of the hot tower to the top of the cold tower is passed through a cooling means.

4. Apparatus for obtaining a product enriched in deuterium by dual temperature isotope exchange as in claim 1 wherein the humidifier section comprises a humidifier recycle section and a booster humidifier section in series in the gas and liquid streams such that the recycled gas from the top of the cold tower passes first through the recycle section and the booster section before entering the bottom of the hot tower and the liquid stream passes through them in the reverse order, the heated input feed is applied to the top of the booster section, and the recycle section is connected to the means for heat exchange between humidifier and dehumidifier.

5. Apparatus for obtaining a product enriched in deuterium by dual temperature isotope exchange as in claim 1 further comprising means for additionally heating the cold inlet feed liquid by injecting steam into the liquid stream before feeding to the top of the humidifier.

* * * * *